United States Patent
Suzuki et al.

(10) Patent No.: US 6,564,916 B1
(45) Date of Patent: May 20, 2003

(54) FRICTIONAL ENGAGING DEVICE AND FRICTIONAL ENGAGEMENT CONTROL METHOD

(75) Inventors: Atsushi Suzuki, Okazaki (JP); Masataka Kawabata, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/857,352

(22) PCT Filed: Nov. 5, 1999

(86) PCT No.: PCT/JP99/06183
§ 371 (c)(1),
(2), (4) Date: Jun. 4, 2001

(87) PCT Pub. No.: WO00/34676
PCT Pub. Date: Jun. 15, 2000

(30) Foreign Application Priority Data

Dec. 8, 1998 (JP) .............................. 10-349041

(51) Int. Cl.[7] .................... F16D 28/00; F16D 55/00
(52) U.S. Cl. ................ 192/21.5; 192/84.1; 192/113.35
(58) Field of Search ................. 192/21.5, 40, 84.1, 192/85 AA, 113.3, 113.35, 70.12; 188/267.1

(56) References Cited

U.S. PATENT DOCUMENTS

| | | | |
|---|---|---|---|
| 2,738,044 A | * 3/1956 | Winther | 192/21.5 |
| 2,955,692 A | * 10/1960 | Thomas | 192/21.5 |
| 4,896,754 A | * 1/1990 | Carlson et al. | 188/267.1 |
| 5,090,531 A | * 2/1992 | Carlson | 188/267.1 |
| 5,988,336 A | * 11/1999 | Wendt et al. | 188/267.1 |
| 6,122,130 A | * 9/2000 | Boutaghou et al. | 360/254.8 |
| 6,269,924 B1 | * 8/2001 | Sugimoto et al. | 192/21.5 |

FOREIGN PATENT DOCUMENTS

| | | | |
|---|---|---|---|
| CN | 1 223 348 A | | 7/1999 |
| EP | 0 252 583 A2 | | 1/1988 |
| GB | 2 217 401 A | * | 10/1999 |
| JP | 6-288418 A | | 10/1994 |
| JP | 8-135687 A | | 5/1996 |
| JP | 8-135688 A | | 5/1996 |
| JP | 8-312523 A | | 11/1996 |
| JP | 9-53663 A | | 2/1997 |
| JP | 10-25150 A | | 1/1998 |
| JP | 10-96435 A | | 4/1998 |

* cited by examiner

Primary Examiner—Rodney H. Bonck
(74) Attorney, Agent, or Firm—Burns, Doane, Swecker & Mathis, LLP

(57) ABSTRACT

A frictional engaging device and frictional engagement control method, wherein the phenomenon of the frictional coefficient of the friction surfaces of a friction engagement device being changed when an electric field is applied to the friction surfaces, is utilized to control the transmittal force. Under the action of a pushing force, friction engagement members are brought into direct contact with each other for frictional engagement. When an electric field is applied between the frictional engagement members, the frictional coefficient of the friction surfaces changes, which means that the transmittal force can be changed. An example of the frictional engagement device is a clutch device (10). A friction member (20) made of insulation material is attached to an input disk (16) and engages an output disk (22). The friction surfaces are lubricated. A control device (30) controls a voltage applying device (28) and applies a voltage to an electrode (26) to provide a desired transmittal force.

14 Claims, 5 Drawing Sheets

FRICTIONAL ENGAGING DEVICE AND FRICTIONAL ENGAGEMENT CONTROL METHOD

TECHNICAL FIELD

The present invention relates to a friction engagement apparatus capable of preferable control of a transmission force through friction engagement, and to a friction engagement control method therefor.

BACKGROUND ART

Friction engagement apparatuses utilizing a friction force for transmission are known and used in various kinds of equipment. Taking a vehicle as an example, a clutch mounted inside an automatic transmission is one example of a friction engagement apparatus. A friction brake, mounted to a wheel, can also be viewed as a friction engagement apparatus.

Conventionally, desirable control of a transmission force of a friction engagement apparatus requires a mechanical hydraulic control mechanism for varying a pushing force (pressing force) which presses the friction surface.

However, if such a transmission force of a friction engagement apparatus could be controlled by any means other than mechanical control, various advantages, including simplification of an apparatus, would be possible.

As a reference, Japanese Patent Application Laid-open No. Hei 8-135688 discloses a technique utilizing electrical viscous liquid. The viscosity of an electrical viscous liquid varies when different voltages are applied to the liquid, so that a transmission force can be varied through voltage control. However, as a transmission force is varied solely through variation of the viscosity, only a small transmission force can be generated. Moreover, as the unit is filled with liquid, large agitation resistance is generated.

As another reference, Japanese Patent Application Laid-open No. Hei 10-26150 discloses an electrically controlled motion transmission apparatus in which a drive body and a driven body are arranged opposing each other and having a space between them, and wherein an electric conductive fiber is placed in the space. Voltage application to the space between the bodies causes the fiber to stand due to electrostatic attraction, generating a shear stress between the opposed surfaces of the respective bodies. A transmission force can be obtained by means of the shear force and controlled by controlling the voltage applied.

Similar techniques are also disclosed in Japanese Patent Application Laid-open Nos. Hei 9-53663 and Hei 10-96435.

The above mentioned techniques, however, can generate only a small transmission force in a limited range because they basically obtain a transmission force from electrostatic attraction of fiber, and only minute electrostatic attraction can be obtained by applying a voltage. An arrangement having electrical viscous fluid filling the space between the drive and driven bodies likewise can generate only a small transmission force.

As described above, conventional transmission force control is achieved mainly using a mechanical hydraulic control mechanism. Although techniques for controlling liquid viscosity or electrostatic attraction through voltage application are available, because mechanical friction engagement is interrupted, only a small transmission force is obtainable.

Against this background, the object of the present invention is to provide a preferable friction engagement apparatus capable of providing a desired transmission force.

DISCLOSURE OF INVENTION

In order to achieve the above object, the present invention utilizes the fact that a friction coefficient of a friction surface of a friction engagement apparatus varies upon impartation of an electric field thereto, and controls a transmission force utilizing this phenomenon.

A friction engagement apparatus of the present invention comprises a plurality of friction engagement members for mutual friction engagement; a pushing force generation device for generating a pushing force bringing the plurality of friction engagement members into friction engagement; and an electric field imparting device for imparting an electric field to a space between the plurality of friction engagement members to change friction coefficients of friction surfaces.

In a friction engagement apparatus of the present invention, a plurality of friction engagement members are in direct friction engagement by the action of a pushing force. An electric field imparting device imparts an electric field to spaces between a plurality of friction engagement members. The imparting of an electric field causes a friction coefficient of a friction surface between the friction engagement members to vary. A transmission force follows a pushing force and a friction coefficient of the friction surface. Therefore, it is possible to control a transmission force of the friction engagement apparatus by imparting an electric field.

Preferably, a control device for controlling the strength of an electric field imparted by the electric field imparting device is provided. A friction coefficient of a friction surface increases or decreases according to the strength of an electric field, as a result of which a transmission force varies.

Also preferably, the friction surfaces of the plurality of friction engagement members are lubricated by a lubrication agent, and the lubrication agent may preferably contain a polarized additive. It is assumed that the polarized additive is absorbed in a friction surface under influence of an electric field, and that a friction coefficient of the friction surface vary due to the absorption of the additive.

Further preferably, at least one of the friction engagement members is provided with an insulative friction member, so that an input side and an output side are in mutual contact via the friction member. This makes it possible to readily impart a desired electric field. Power consumption is advantageously reduced.

A friction engagement apparatus may be a clutch or brake device, for example.

A friction engagement apparatus may include a pushing force control device for increasing or decreasing a pushing force.

According to a friction engagement control method of the present invention, a transmission force between a plurality of friction engagement members is controlled by imparting an electric field to spaces between the plurality of friction engagement members which are in mutual friction contact.

BEST MODE FOR CARRYING OUT THE INVENTION

In the following, a preferred embodiment of the present invention will be described with reference to the accompanying drawings.

Figure 1:
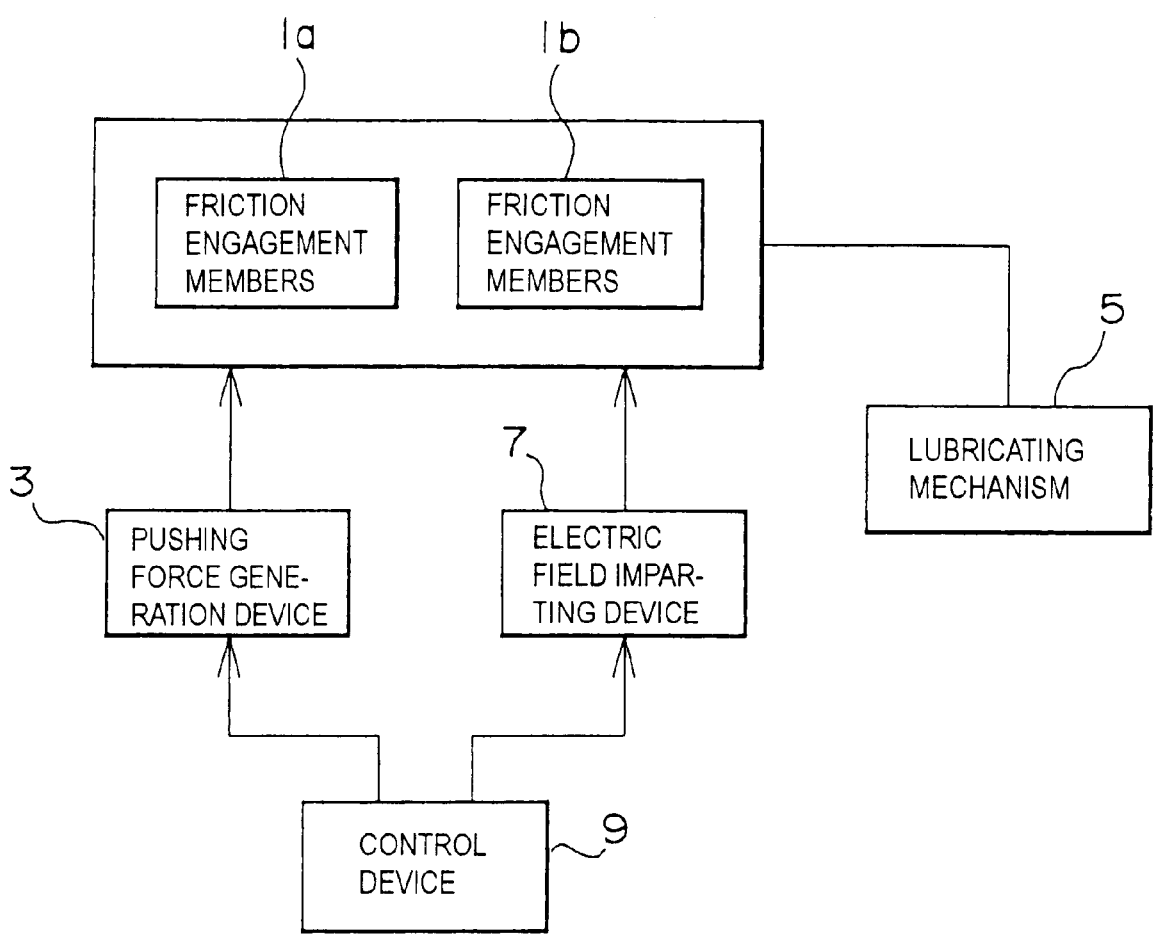
FIG. 1 is a block diagram showing a structure a friction engagement apparatus of the present invention.

FIG. 1 is a block diagram conceptually illustrating a structure of a friction engagement apparatus of the present invention. Friction engagement members 1a, 1b are configured such that mutual friction engagement is possible. A pushing force generation device 3 generates a pushing force for bringing the friction engagement members 1a, 1b into mutual friction engagement. A lubricating mechanism 5 lubricates the friction surfaces of the friction engagement members 1a, 1b. An electric field imparting device 7 imparts an electric field to a space between the friction engagement members 1a, 1b. An electric field imparted causes a friction coefficient of the friction surface to vary, whereby a transmission force is changed.

A control device 9 controls the pushing force generation device 3 and the electric field imparting device 7. Specifically, the control device 9 controls the pushing force generation device 3 so as to generate a pushing force, and also controls the strength of an electric field generated by the electric field imparting device 7. More specifically, preferably, the control device 9 controls the voltage to be applied to the friction engagement members 1a, 1b. Because the friction coefficient varies according to the strength of the electric field applied, a transmission force of a desirable magnitude can be obtained.

Figure 2:
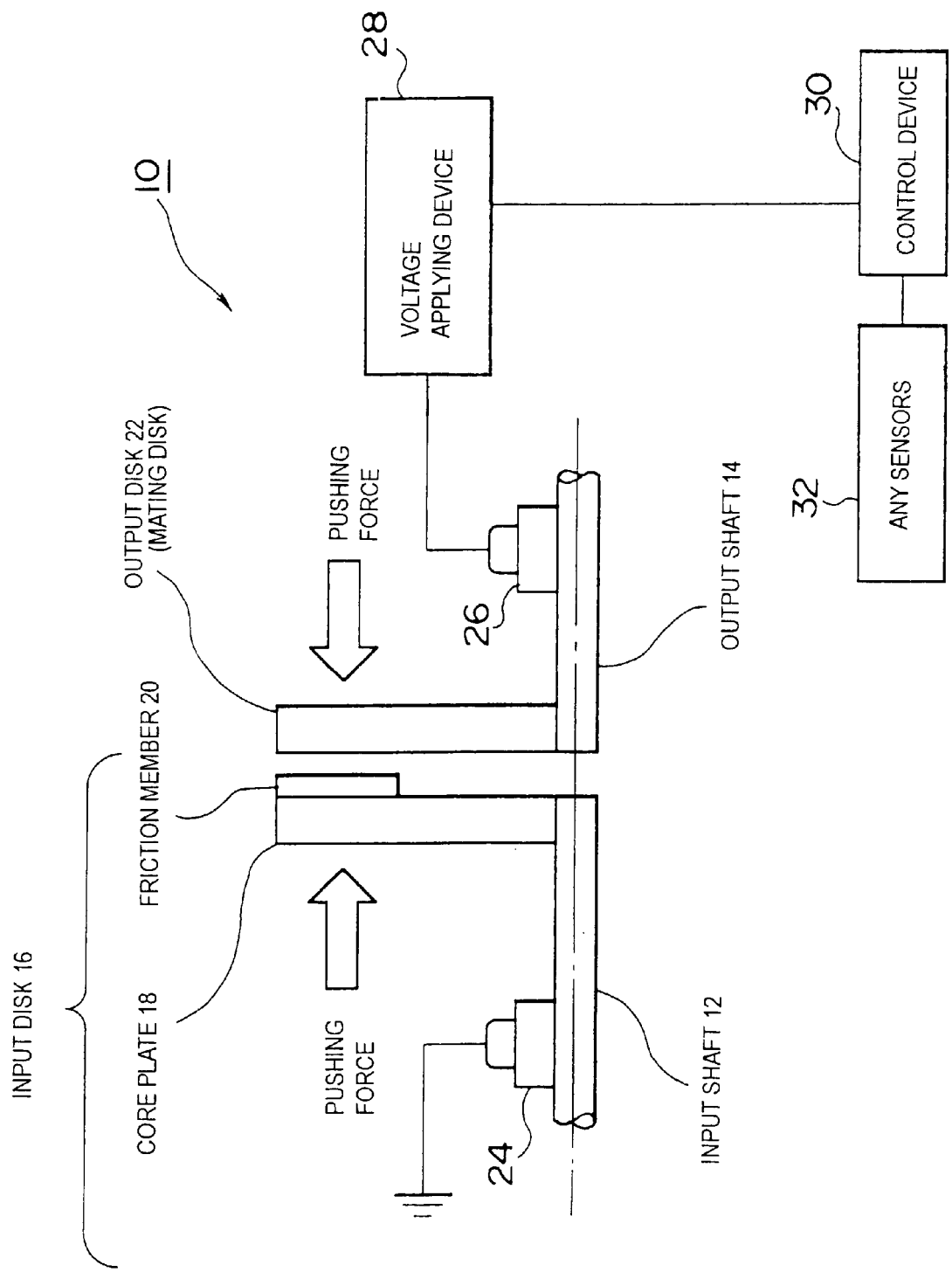
FIG. 2 is a diagram showing a single disk clutch device incorporating the present invention.

Referring to FIG. 2, the present invention is applied to a single disk clutch device 10. In this device, an input shaft 12 and an output shaft 14 are aligned along the same axis. These shafts 12, 14 are supported via an insulation member, and connected to other shafts via an insulation member.

The input disk 16 comprises a core plate 18, attached to the input shaft 12, and a friction member 20, attached to the core plate 18. The friction member 20 is made of an insulative member, such as paper material. Meanwhile, the output shaft 14 has an output disk (a mate disk) 22 attached thereto. The disks 16, 22 correspond to the friction engagement members of the present invention. The opposed surfaces of the friction member 20 and the output disk 22, serving as friction surfaces, are disposed with a predetermined intervening space.

Both disks 16, 22 are brought into mutual friction contact by being pressed to each other by a pushing force Fc applied by a pushing force generation device, not shown. A pushing force generation device may be, for example, a known hydraulic mechanism for use in a vehicle automatic transmission or the like. A hydraulic mechanism may or may not have a function for desirable adjustment of the pushing force.

The friction surfaces of the disks 16, 22 are lubricated by a lubricating mechanism, not shown. For example, a housing may be provided surrounding the disks 16, 22 with lubrication oil filled inside the housing such that the disks 16, 22 are bathed in the lubrication oil.

It should be noted that the entire friction plates are not necessarily bathed in the lubrication oil. Alternatively, a minimum structure in which the friction surface is sufficiently lubricated is also preferable, and can suppress agitation resistance.

Preferably, lubrication oil contains polarized material. Preferably, at least one of organic additive (anti-abrasive agent, detergent dispersant, and so on), conductive particulate (carbon particulate, and so on), and induced polymer particulate (poly-aniline, poly-α-amino acid, and so on) is dispersed in the medium oil. Medium oil may be hydrocarbon oil, such as vegetable or animal oil and mineral oil, silicon oil, other synthetic fluid, liquid crystal, solvent, and so on.

Referring again to FIG. 2, the input shaft 12 is provided with a first electrode 24, which is grounded, while the output shaft 14, is provided with a second electrode 26, which is connected to a voltage applying device 28.

The voltage applying device 28 is an embodiment of an electric field imparting device of the present invention. The voltage applying device 28 comprises a power source and a voltage conversion section, and generates a desired voltage Vc between the electrodes 24, 26 under control by the control device 30. As the electrodes are mutually insulated by the friction member 20, an electric field corresponding to the voltage Vc applied is imparted to the friction surface. The friction surfaces, being pressed by the pushing force Fc, are under boundary lubricated condition, and, when an electric field is applied to the surfaces, friction coefficients $\mu c$ of them take a value commensurate with the strength of the imparted electric field. The transmission force between the input and output axes is determined according to the friction coefficient $\mu c$.

Here, the variation of the friction coefficient $\mu c$ upon application of an electric field is most likely because the properties of the additives or dispersed particulate in the lubrication oil being absorbed in a friction interface may vary under a strong electric field, and, as a result of a change in the amount of the additives or dispersed particles being absorbed in the friction boundary, the boundary friction force between the friction surfaces increases or decreases accordingly.

Figure 3:
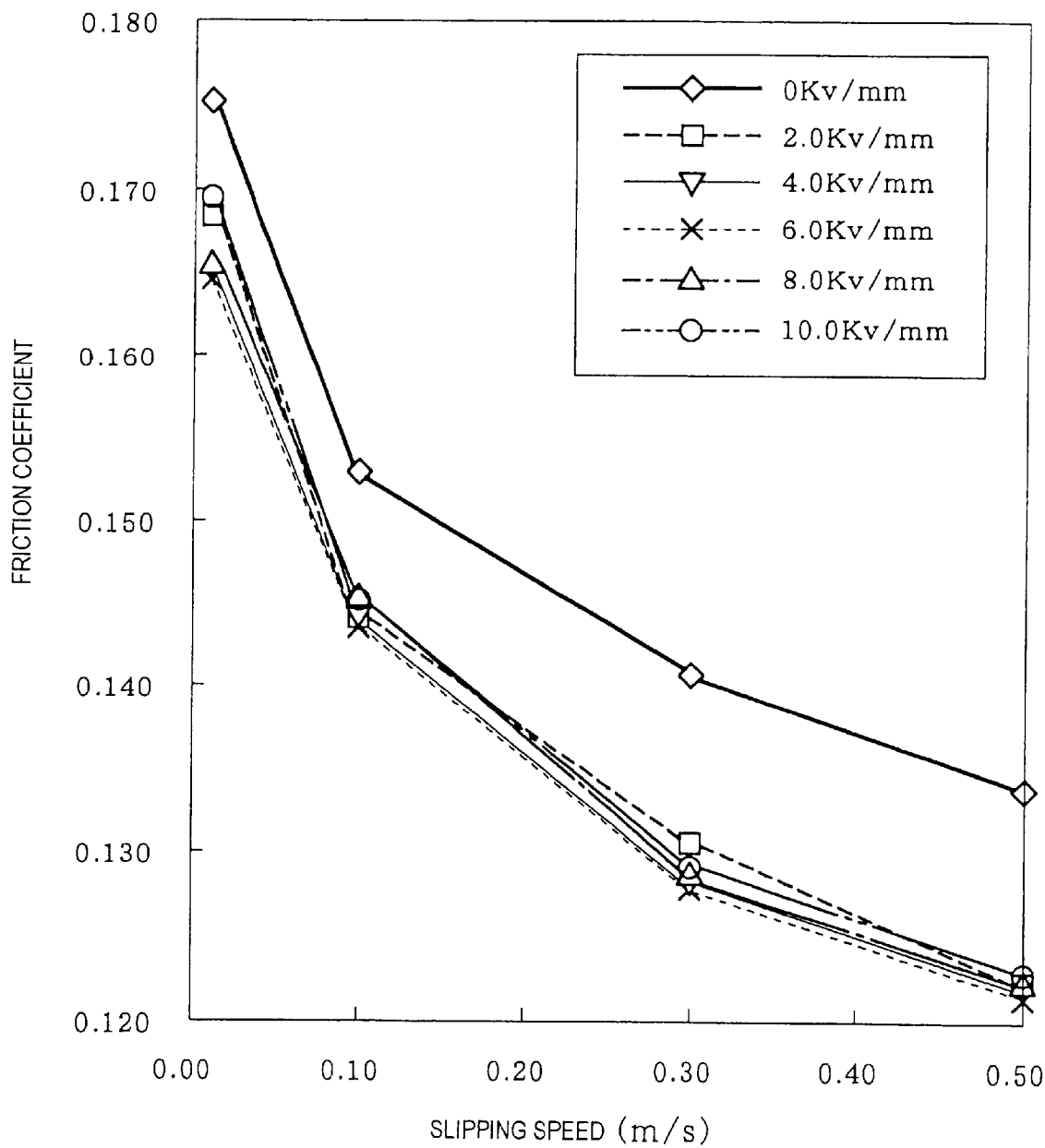
FIG. 3 is a diagram showing relationship between an applied voltage and a friction coefficient of a friction surface.
Figure 4:
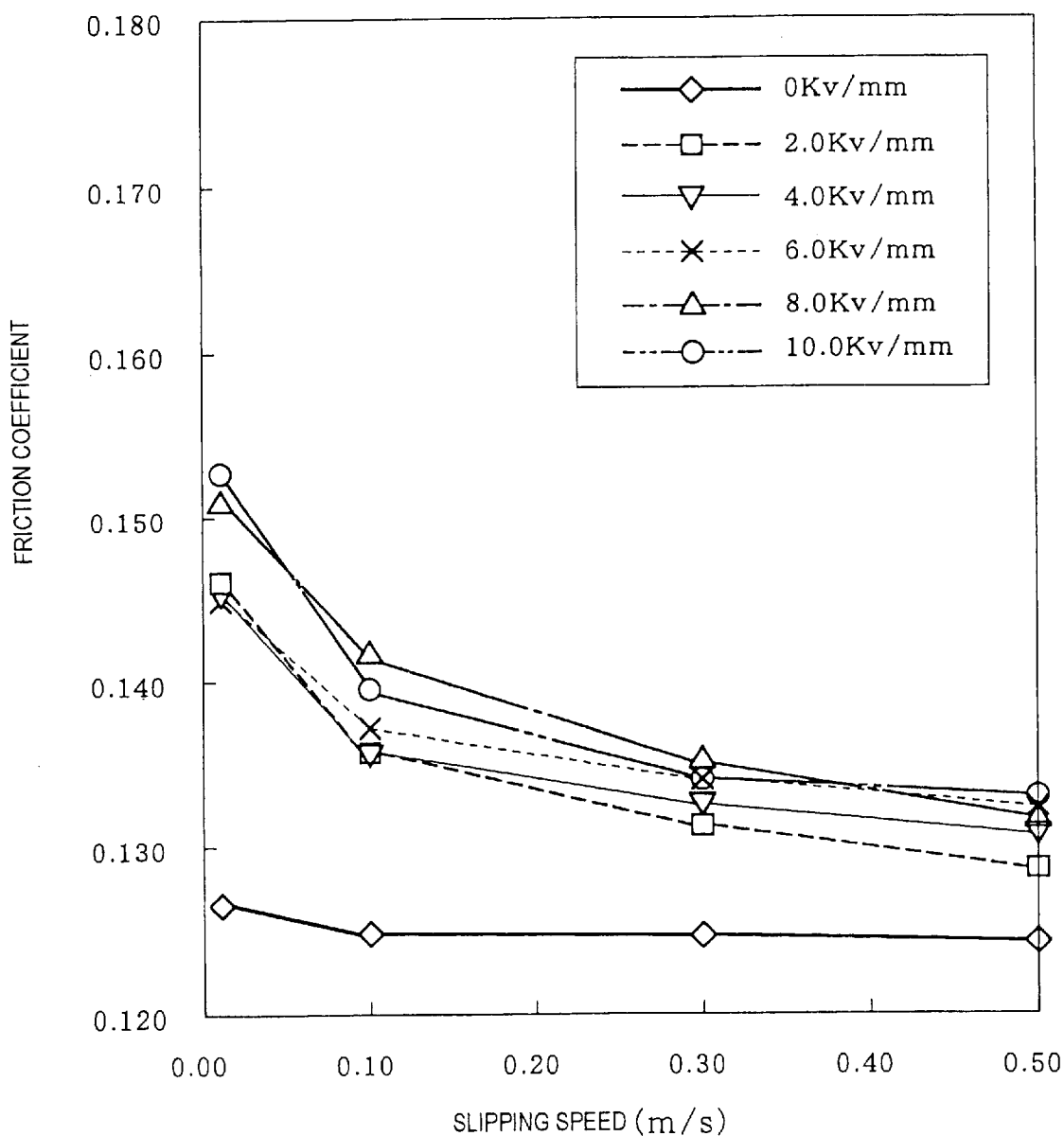
FIG. 4 is a diagram showing relationship between an applied voltage and a friction coefficient of a friction surface.

Referring to FIGS. 3 and 4, the increase or decrease of a friction coefficient upon application of an electric field depends on the lubrication oils or additives used. In the graph of these drawings, the abscissas indicates a slipping speed, while the ordinate indicates a friction coefficient. These graphs present friction coefficients with the whole disk bathed in a lubrication oil.

Referring particularly to FIG. 3, the lubrication oil used is silicon oil containing carbon particulate dispersed therein. As compared with a case where no electric field is applied, the friction coefficient decreases when an electric field applied. This may be explained as a result of the carbon particulate absorbed in the friction surface.

Referring now to FIG. 4, the lubrication oil in use is mineral oil containing polymer or organic additives dispersed therein. As shown, a friction coefficient increases under an electric field. This may be explained as a result of the polymer or organic additives absorbed in the friction surface.

As described above, preferably, lubrication oil containing additives is used in putting the present invention into practice. As lubrication oil actually used in various equipment often contain additives, positive utilization of these properties of the additives is preferred. However, as a friction coefficient varies also when lubrication oil free from additives is used, the present invention can be realized even without additives.

By making use of the above described properties, the control device 30 controls a transmission force between the input and output axes. The control device 30 determines a voltage Vc which will result in a desired transmission force, based on input signals from any sensors 32. In an exemplary case where the present invention is applied to a vehicle automatic transmission, the sensors 32 determine a vehicle speed, an acceleration opening, shift lever operation, an oil temperature, and so on. A voltage Vc determined as above is applied to the electrode 26, and an electric field corresponding to the applied voltage Vc is resultantly generated. As a result, a desired friction coefficient and transmission force can be obtained.

Figure 5:
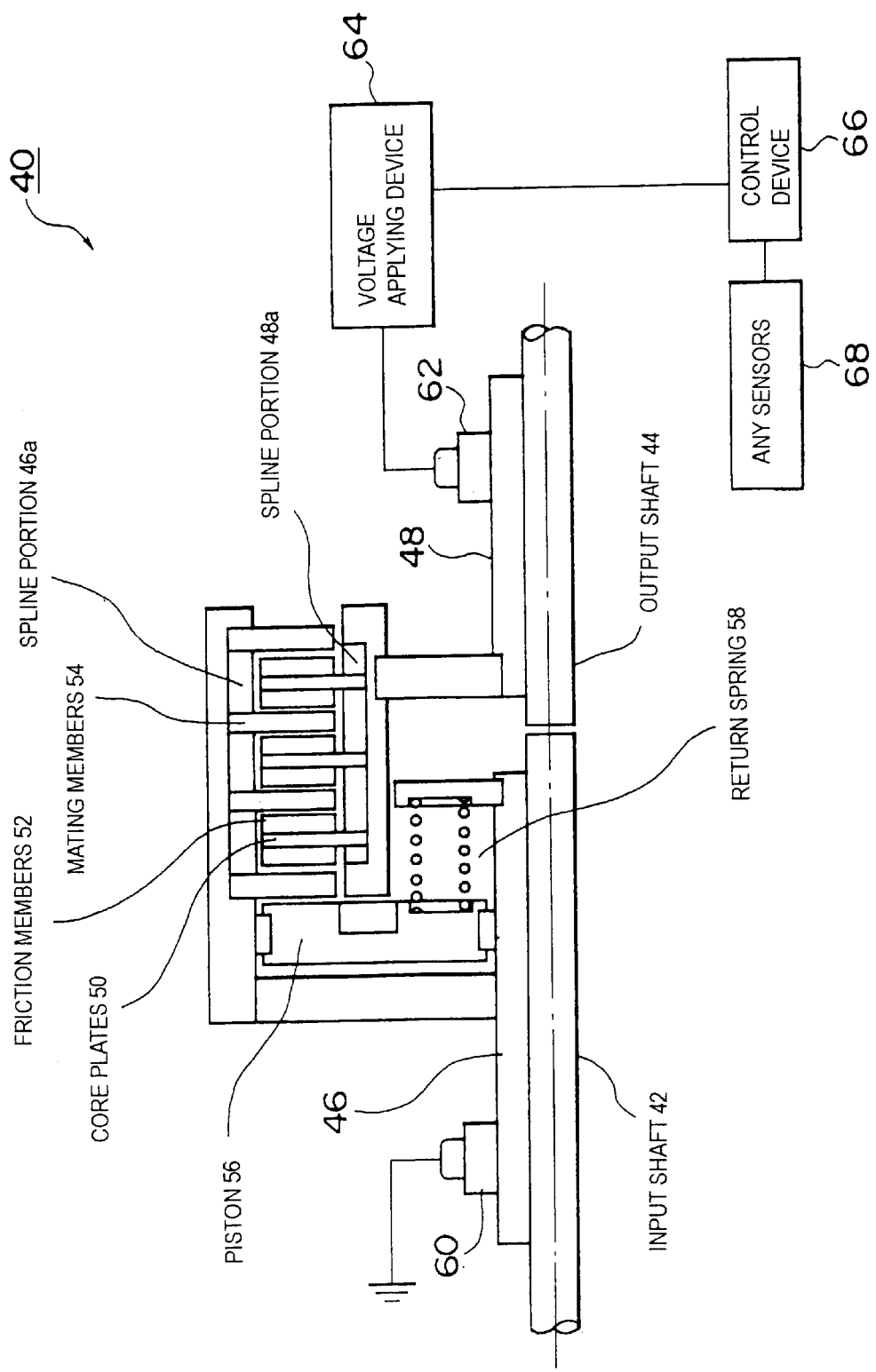
FIG. 5 is a diagram showing a multiple disk clutch device incorporating the present invention.

Referring next to FIG. 5, the present invention is applied to a multiple disk clutch device 40. The clutch device 40 has a structure identical to that of a clutch device used inside a typical automatic transmission. Whereas the clutch device 10 of FIG. 2 has a pair of friction engagement members, the clutch device 40 of FIG. 5 has a plurality of alternately arranged clutch plates, or a plurality of pairs of multiple friction members. In the following, duplicated descriptions are not repeated.

An input shaft 42 and an output shaft 44 are aligned on the same axis. An input disk base 46 and an output disk base 48 are attached to the input shaft 42 and the output shaft 44, respectively, while being insulated. There are attached a plurality of core plates 50 in parallel to a spline portion 48a of the iron output disk base 48. Friction members 52 are attached on both sides of the core plate 50. Meanwhile, there are attached a plurality of mate members 54 in parallel to a spline portion 46a of the input disk base 46. The mate members 54 and the core plates 50 are alternately arranged.

The input disk base 46 is provided with an axially movable piston 56. with the clutch disconnected, the piston 56 is positioned at a reference position by the action of a return spring 58 of the piston 56. With the clutch connected, on the other hand, the, piston 56 is pressed toward the output shaft 44 by the action of the pressure of oil supplied to an oil chamber located on the back side. As a result, the friction member 52 is pressed onto the mate member 54 whereby the clutch is engaged.

The input disk base 46 has an electrode 60, which is grounded, while the output disk base 48 has an electrode 62, which is connected to a voltage applying device 64. As described earlier, the control device 66 controls the voltage applying device 64 based on input signals from the any sensors 68 so that a voltage Vc is applied to the electrode 62. With this arrangement, a transmission force commensurate with the voltage Vc can be obtained.

It should be noted that, although the present invention is applied to a clutch device in the example of the above embodiment, the present invention is also applicable to other types of friction engagement apparatus. For example, the present invention is applicable to brakes and to motion restriction apparatuses, such as a differentials and torque transmission coupling. When the present invention is applied to a brake, preferably, a friction engagement member on the output side may be fixed.

Moreover, application of the present invention is not restricted to vehicles. The invention may, for example, also be applied to equipment having various units for industrial machines.

Although flat surfaces of disks are brought into mutual contact through engagement in the above example, the present invention is applicable to other types of engagement apparatus. For example, the present invention can similarly be applied to an engagement apparatus having two co-axially positioned cylindrical surfaces (outside and insider cylindrical surfaces).

Although a pushing force for friction engagement is obtained due to hydraulic pressure, other types of pushing force generation devices are also included in the scope of the present invention. Specifically, a spring may be used for pushing force generation.

A pushing force generation device of the present invention may have any structure capable of ultimately producing a force to press a friction surface. That is, any structure which generates a pushing force as a result of any other operation such as stretching, spreading, contraction, and any other operation, is also included in a pushing force generation device of the present invention.

As described above, according to the present invention, there is provided a novel friction engagement unit capable of desirably increasing or decreasing a friction coefficient of the disk friction surfaces when they are lubricated and mutually engaged, through application of a desired electric field to a space between these disks.

The present invention can produce advantages such as the following:

(1) A transmission force in transmission of a force through friction engagement between a disk on the friction member side and its mate disk, can be desirably changed without mechanically changing a friction force. As long as a constant mechanical force is obtained, a transmission force can be freely adjusted electrically.

(2) As a friction coefficient between friction surfaces is directly controlled in the present invention, there is no hunching, as occurrs with hydraulic control.

In addition, as a friction coefficient is directly controlled, quick response of transmission force control is achieved and a transmission force can be instantly changed. By utilizing this feature, fluctuation of a transmission force due to hydraulic hunching and so on can be suppressed. That is, the fluctuation can be suppressed by detecting fluctuation of a transmission force, and increasing or decreasing the friction coefficient so as to offset the fluctuation.

(3.1) A simple hydraulic mechanism imparting a constant force is sufficiently usable. This allows elimination of a hydraulic control valve, simplifying a hydraulic circuit.

(3.2) A structure of the present invention can also preferably coexist with a hydraulic control mechanism. That is, a pushing force control device can be provided to a friction engagement apparatus. This enables fine control of a transmission force over a very wide range. Preferably, a plurality steps of transmission force ranges are set. Transmission force ranges are switched through control of a hydraulic force by means of hydraulic pressure. Adjustment of a transmission force in the range is achievable through application and control of an electric field.

(4) An insulative friction member may be provided to at least one of the friction engagement members. A friction surface is provided to the friction member. As an electric field is applied via the friction member, very little power is consumed. That is, a transmission force can be controlled using only little power.

(5) Lubrication oil may be gear oil, such as general ATT and so on, engine oil, various other fluids. This allows realization of the present invention for low costs.

(6) A large friction coefficient can be obtained through application of an electric field. This enables an increase of a transmission force due to a mechanical friction force and, accordingly, size reduction of a friction engagement apparatus. For example, the number of disks of a multiple clutch device in FIG. 5 can be reduced, and its axial length can be reduced. This enables a unit with a lighter weight and a compact structure.

(7) A larger friction coefficient can be obtained through application of an electric field. As a transmission force is determined depending on a product of a friction coefficient and a pushing force, a pushing force can be reduced instead of increasing a friction coefficient. This enables reduction of shock at the start of engagement.

Finer control of an applied voltage enables suppression of the shock which results from abrupt engagement between engagement elements.

A friction coefficient may fluctuate during a process from start to completion of engagement (in actuality, only a very short period), which can cause an engagement shock. To address this problem, an electric field is controlled so as to offset the friction coefficient fluctuation caused in engagement operation. For example, preferably, a transmission force is determined using an appropriate sensor, and an applied voltage is controlled (feedback control and so on), so that transmission force fluctuation can be suppressed. This enables smooth increase of a transmission force, allowing suppression of engagement shock.

(8) By changing combination of a friction material and a fluid depending on the purpose, reduction of a friction coefficient, as shown in FIG. 3, and increase of a friction coefficient, as shown in FIG. 4, can be realized through application of an electric field. That is, a transmission force can be readily controlled to generate a desirable transmission force.

As described above, according to the present invention, a friction coefficient of a friction surface is varied through application of an electric field, thereby controlling a transmission force. This enables simplification of a friction engagement apparatus and fluctuation suppression.

INDUSTRIAL APPLICABILITY

As described above, a friction engagement apparatus of the present invention is applicable to, for example, a clutch device, a brake device, and other types of engagement devices and transmission devices.

What is claimed is:

1. A friction engagement apparatus, comprising:
    a plurality of friction engagement members for mutual friction engagement;
    a pushing force generation device for generating a pushing force bringing the plurality of friction engagement members into friction engagement;
    lubrication agent for lubricating friction surfaces of the plurality of friction engagement members, the lubricating agent containing an additive other than a dielectric anistropic liquid crystal; and
    an electric field imparting device for imparting an electric field to a space between the plurality of friction engagement members to change an amount of particles of the lubrication agent absorbed into the friction surfaces to change friction coefficients of the friction surfaces.

2. A friction engagement apparatus according to claim 1, further comprising:
    a control device controlling strength of the electric field imparted by the electric field imparting device.

3. A friction engagement apparatus according to claim 2, wherein the lubrication agent contains a polarized additive.

4. A friction engagement apparatus according to claim 1, wherein the lubrication agent contains a polarized additive.

5. A friction engagement apparatus according to claim 4, wherein the additive has a property causing a friction coefficient between the plurality of friction engagement members to increase when an electric field is imparted by the electric field imparting device.

6. A friction engagement apparatus according to claim 4, wherein the additive has a property causing a friction coefficient between the plurality of friction engagement members to decrease when an electric field is imparted by the electric field imparting device.

7. A friction engagement apparatus according to claim 1, wherein at least one of the plurality of friction engagement members includes a friction member made from an insulative material.

8. A friction engagement apparatus according to claim 1, further comprising:
    a pushing force control device for controlling a pushing force generated by the pushing force generation device.

9. A friction engagement apparatus according to claim 1, wherein the friction engagement device is a clutch device.

10. A friction engagement apparatus according to claim 1, wherein the friction engagement device is a brake device.

11. A friction engagement control method for controlling a transmission force between a plurality of friction engagement members comprising:
    lubricating friction surfaces of the plurality of friction engagement members with a lubricating agent containing an additive other than a dielectric anistropic liquid crystal;
    imparting an electric field to a space between the plurality of friction engagement members which are in mutual friction contact, with the electric field acting upon the additive in the lubricating agent to change friction coefficients of the friction surfaces.

12. The friction engagement control method according to claim 11, wherein the additive is absorbed into the friction surfaces under influence of the electric field.

13. The friction engagement control method according to claim 11, wherein the friction coefficients of the friction surfaces are increased when the electric field is imparted to the space between the plurality of friction engagement members which are in mutual friction contact.

14. The friction engagement control method according to claim 11, wherein the friction coefficients of the friction surfaces are decreased when the electric field is imparted to the space between the plurality of friction engagement members which are in mutual friction contact.

* * * * *